(12) United States Patent
Miura et al.

(10) Patent No.: US 9,151,630 B2
(45) Date of Patent: Oct. 6, 2015

(54) EVALUATION INDICATION SYSTEM, EVALUATION INDICATION METHOD AND COMPUTER-READABLE STORAGE MEDIUM

(75) Inventors: Naoki Miura, Toyokaha (JP); Junichi Nonomura, Okazaki (JP); Junki Yamakawa, Okazaki (JP); Hiroyuki Mizuno, Kariya (JP)

(73) Assignee: AISIN AW CO., LTD., Anjo (JP)

( * ) Notice: Subject to any disclaimer, the term of this patent is extended or adjusted under 35 U.S.C. 154(b) by 420 days.

(21) Appl. No.: 13/523,193

(22) Filed: Jun. 14, 2012

(65) Prior Publication Data

US 2013/0018573 A1     Jan. 17, 2013

(30) Foreign Application Priority Data

| Jul. 5, 2011 | (JP) | ................................. 2011-148878 |
| Aug. 5, 2011 | (JP) | ................................. 2011-171681 |
| Aug. 5, 2011 | (JP) | ................................. 2011-171682 |
| Sep. 28, 2011 | (JP) | ................................. 2011-213307 |

(51) Int. Cl.
```
G06F 19/00      (2011.01)
G06G 7/70       (2006.01)
G01C 21/34      (2006.01)
```

(52) U.S. Cl.
CPC ..... *G01C 21/3469* (2013.01); *B60K 2350/1092* (2013.01)

(58) Field of Classification Search
None
See application file for complete search history.

(56) References Cited

U.S. PATENT DOCUMENTS

| 6,314,363 | B1 | 11/2001 | Pilley et al. |
| 2002/0056314 | A1 | 5/2002 | Kumagai et al. |
| 2003/0006914 | A1* | 1/2003 | Todoriki et al. ............... 340/995 |
| 2006/0271284 | A1 | 11/2006 | Watanabe et al. |
| 2007/0005237 | A1 | 1/2007 | Needham et al. |
| 2007/0078599 | A1 | 4/2007 | Yoshioka et al. |
| 2008/0294339 | A1 | 11/2008 | Tauchi et al. |
| 2010/0049397 | A1* | 2/2010 | Liu et al. ......................... 701/33 |
| 2010/0058225 | A1 | 3/2010 | Lin et al. |
| 2011/0238457 | A1* | 9/2011 | Mason et al. ................ 705/7.14 |
| 2011/0288737 | A1 | 11/2011 | Carr |
| 2012/0004838 | A1 | 1/2012 | Lee et al. |
| 2012/0022904 | A1 | 1/2012 | Mason et al. |

(Continued)

FOREIGN PATENT DOCUMENTS

| DE | 10 2006 054 326 A1 | 5/2008 |
| DE | 10 2007 007 955 A1 | 8/2008 |

(Continued)

OTHER PUBLICATIONS

Oct. 29, 2013 Office Action issued in U.S. Appl. No. 13/530,917.

(Continued)

*Primary Examiner* — Tuan C. To
*Assistant Examiner* — Paul Castro
(74) *Attorney, Agent, or Firm* — Oliff PLC

(57) ABSTRACT

Evaluation indication systems, methods, and programs display a current position of a vehicle and a map around the current position on a display unit, acquire current evaluations that indicate evaluations of fuel consumption in current travel of the vehicle by unit sections, and acquire previous evaluations that indicate evaluations of fuel consumption of the vehicle in a past prior to the current travel by unit sections. The systems, methods, and programs indicate the current evaluations and the previous evaluations together by unit sections on the map.

18 Claims, 5 Drawing Sheets

(56) References Cited

U.S. PATENT DOCUMENTS

| | | | |
|---|---|---|---|
| 2012/0029803 A1 | 2/2012 | Yasushi et al. | |
| 2012/0173075 A1* | 7/2012 | Mays | 701/34.2 |
| 2012/0191334 A1* | 7/2012 | Kashio et al. | 701/123 |
| 2012/0197504 A1* | 8/2012 | Sujan et al. | 701/70 |
| 2012/0265433 A1 | 10/2012 | Viola et al. | |
| 2013/0179062 A1 | 7/2013 | Yasushi et al. | |
| 2013/0245945 A1 | 9/2013 | Morita et al. | |

FOREIGN PATENT DOCUMENTS

| | | |
|---|---|---|
| DE | 10 2008 041 255 A1 | 2/2010 |
| EP | 1 973 078 A1 | 9/2008 |
| EP | 2 295 934 A1 | 3/2011 |
| JP | H09184732 A | 7/1997 |
| JP | H10-227648 A | 8/1998 |
| JP | A-2002-350152 | 12/2002 |
| JP | 2003288003 A | 10/2003 |
| JP | A-2004-251786 | 9/2004 |
| JP | 2004286496 A | 10/2004 |
| JP | 2006-030058 A | 2/2006 |
| JP | 2007187681 A | 7/2007 |
| JP | 2008180576 A | 8/2008 |
| JP | 2009-002847 A | 1/2009 |
| JP | 2010-151570 A | 7/2010 |
| JP | A-2010-182108 | 8/2010 |
| JP | A-2011-033447 | 2/2011 |
| WO | 2011/030397 A1 | 3/2011 |
| WO | WO 2011/030398 | 3/2011 |
| WO | WO 2011030398 A1 * | 3/2011 |

OTHER PUBLICATIONS

European Search Report issued in European Patent Application No. EP 12 17 3213.5 dated Jun. 23, 2014.

European Search Report issued in European Patent Application No. EP 12 17 3221.8 dated Jun. 18, 2014.

European Search Report issued in European Patent Application No. EP 12 17 3234.1 dated Jun. 23, 2014.

Jan. 16, 2015 Office Action issued in U.S. Appl. No. 13/523,276.

* cited by examiner

EVALUATION INDICATION SYSTEM, EVALUATION INDICATION METHOD AND COMPUTER-READABLE STORAGE MEDIUM

INCORPORATION BY REFERENCE

The disclosure of Japanese Patent Applications No. 2011-213307 filed on Sep. 28, 2011, No. 2011-148878 filed on Jul. 5, 2011, No 2011-171681 filed on Aug. 5, 2011, and No. 2011-171682 filed on Aug. 5, 2011 including the specification, drawings and abstract is incorporated herein by reference in its entirety.

BACKGROUND OF THE INVENTION

1. Field of the Invention

The invention relates to an evaluation indication system, evaluation indication method and computer-readable storage medium that indicate an evaluation of fuel consumption of a vehicle.

2. Description of the Related Art

In related arts, various techniques for indication for improving the fuel consumption of a vehicle have been developed. For example, Japanese Patent Application Publication No. 2011-33447 (JP 2011-33447 A) describes a technique for indicating that the energy consumption of a host vehicle exceeds a reference value in association with locations in a current travel route. In addition, Japanese Patent Application Publication No. 2004-251786 (JP 2004-251786 A) describes a technique for indicating information that allows comparison in each section between a current fuel consumption and a historical average fuel consumption. Furthermore, Japanese Patent Application Publication No. 2002-350152 (JP 2002-350152 A) describes a technique for indicating an evaluation (good, intermediate, bad, or the like) of fuel consumption in previous travel on a map for each location or each route together with an evaluation of current fuel consumption at a current position of the vehicle.

SUMMARY OF THE INVENTION

In the above described related arts, it has been difficult to make a significant comparison on the basis of an evaluation of fuel consumption in current travel and an evaluation of fuel consumption in previous travel. That is, in the techniques described in JP 2011-33447 A and JP 2004-251786 A, a fuel consumption in current travel is compared with a reference value or a historical average value, and a fuel consumption in current travel is evaluated in these techniques; however an evaluation of fuel consumption in previous travel is not indicated. Thus, a driver of a vehicle is not allowed to contrast an evaluation of fuel consumption in previous travel with an evaluation of fuel consumption in current travel while driving, so it cannot be determined whether there is room for suppressing consumption of fuel in current travel by improving the way of driving from a current position.

In addition, in the technique described in JP 2002-350152 A, an evaluation of fuel consumption in previous travel is indicated for each location; however, an evaluation of fuel consumption in current travel indicates only an instantaneous value at a current position. It is actually impossible for a driver to continuously pay attention to an instantaneous value while driving in order to suppress consumption of fuel, so it cannot be determined whether a current fuel consumption has been continuously in good condition. Thus, in JP 2002-350152 A as well, an evaluation of fuel consumption in previous travel cannot be contrasted with an evaluation of fuel consumption in current travel while driving, so it is actually impossible to determine whether there is room for improvement in the way of driving from a current position in consideration of consumption of fuel in current travel before the current position. Thus, in the related art, it has been difficult to suppress consumption of fuel by improving the way of driving during current travel.

The invention provides an evaluation indication system, evaluation indication method and computer-readable storage medium that are able to easily compare a current evaluation of fuel consumption in a travel section with a previous evaluation of fuel consumption in the travel section while driving.

A first aspect of the invention provides an evaluation indication system. The evaluation indication system includes: a map display control unit that displays a current position of a vehicle and a map around the current position on a display unit; a current evaluation acquisition unit that acquires current evaluations that indicate evaluations of fuel consumption in current travel of the vehicle by unit sections; and a previous evaluation acquisition unit that acquires previous evaluations that indicate evaluations of fuel consumption of the vehicle in a past prior to the current travel by unit sections, wherein the map display control unit indicates the current evaluations and the previous evaluations together by unit sections on the map.

A second aspect of the invention provides an evaluation indication method. The evaluation indication method includes: displaying a current position of a vehicle and a map around the current position on a display unit; acquiring current evaluations that indicate evaluations of fuel consumption in current travel of the vehicle by unit sections; acquiring previous evaluations that indicate evaluations of fuel consumption of the vehicle in a past prior to the current travel by unit sections; and indicating the current evaluations and the previous evaluations together by unit sections on the map.

A third aspect of the invention provides a computer-readable storage medium that stores computer-executable instructions for performing an evaluation indication function. The evaluation indication function includes: displaying a current position of a vehicle and a map around the current position on a display unit; acquiring current evaluations that indicate evaluations of fuel consumption in current travel of the vehicle by unit sections; acquiring previous evaluations that indicate evaluations of fuel consumption of the vehicle in a past prior to the current travel by unit sections; and indicating the current evaluations and the previous evaluations together by unit sections on the map.

With the above configurations, the current evaluations and the previous evaluations are indicated on the map so as to be visually recognized at the same time. As a result, the driver is able to drive while easily comparing the current evaluations of fuel consumption with the previous evaluations of fuel consumption in a travel section.

BRIEF DESCRIPTION OF THE DRAWINGS

The features, advantages, and technical and industrial significance of this invention will be described below with reference to the accompanying drawings, in which like numerals denote like elements, and wherein.

DETAILED DESCRIPTION OF THE EMBODIMENTS

Figure 1:
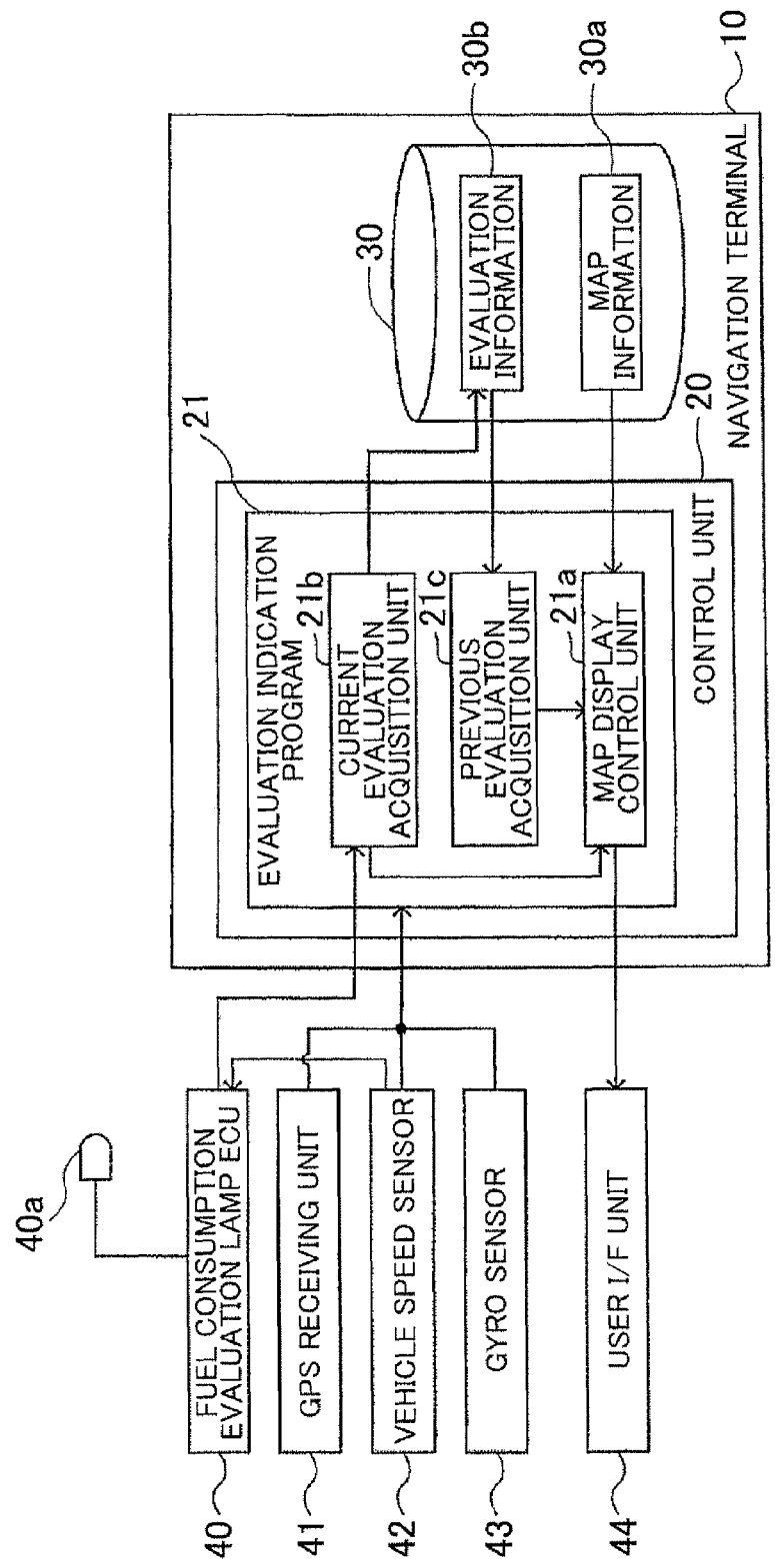
FIG. 1 is a block diagram that shows a navigation terminal that includes an evaluation indication system.

Here, an embodiment of the invention will be described in accordance with the following sequence.
(1) Configuration of Navigation Terminal
(2) Evaluation Information Acquisition Process
(3) Evaluation Information Indication Process
(4) Alternative Embodiments
(1) Configuration of Navigation Terminal FIG. 1 is a block diagram that shows the configuration of an evaluation indication system mounted on a vehicle. In the present embodiment, the evaluation indication system is implemented by a navigation terminal 10. The navigation terminal 10 includes a control unit 20 that has a CPU, a RAM, a ROM, and the like, and the control unit 20 executes programs stored in the ROM. In the present embodiment, the control unit 20 is able to execute a navigation program as one of the programs. The navigation program is a program that causes the control unit 20 to execute the function of displaying a map, including a current position of the vehicle, on a display unit of the navigation terminal and guiding a driver to a destination. The navigation program includes an evaluation indication program 21 that causes the display unit to indicate current evaluations and previous evaluations together.

The vehicle according to the present embodiment includes a fuel consumption evaluation lamp ECU 40, a GPS receiving unit 41, a vehicle speed sensor 42, a gyro sensor 43 and a user I/F unit 44. The GPS receiving unit 41 receives electric waves from GPS satellites and outputs a signal for calculating a current position of the vehicle through an interface (not shown). The control unit 20 acquires the signal output from the GPS receiving unit 41 to acquire the current position of the vehicle. The vehicle speed sensor 42 outputs a signal corresponding to the rotation speed of wheels equipped for the vehicle. The control unit 20 acquires the signal output from the vehicle speed sensor 42 via an interface (not shown) to acquire a vehicle speed. The gyro sensor 43 detects an angular acceleration of a turn of the vehicle in a horizontal plane and outputs a signal corresponding to the direction of the vehicle. The control unit 20 acquires the signal output from the gyro sensor 43 to acquire the travelling direction of the vehicle. The vehicle speed sensor 42, the gyro sensor 43, and the like, are utilized to, for example, correct the current position of the vehicle, determined on the basis of the output signal of the GPS receiving unit 41. In addition, the current position of the vehicle is corrected appropriately on the basis of the track of the vehicle.

The fuel consumption evaluation lamp ECU 40 includes a control circuit for evaluating the fuel consumption of the travelling vehicle on the basis of the operation of the vehicle. A lamp 40a is provided in an instrumental panel of the vehicle, and is connected to the fuel consumption evaluation lamp ECU 40. In the present embodiment, the fuel consumption evaluation lamp ECU 40 determines whether a combination of information that indicates consumption of fuel, information output from the vehicle speed sensor 42 and information that indicates the state of a transmission coincides with a condition for suppressing consumption of fuel. The information that indicates consumption of fuel is, for example, information determined from a signal for operating an injector or information indicated by a fuel consumption sensor. Various conditions may be defined as the condition for suppressing consumption of fuel. In the present embodiment, when the consumption of fuel is smaller than or equal to a predetermined amount, the vehicle speed is higher than or equal to a predetermined threshold and the state of the transmission is a normal state (such as a drive mode other than a sporty mode that is a state for acceleration at high efficiency, or the like), the fuel consumption evaluation lamp ECU 40 determines that the combination of the above pieces of information coincides with the condition for suppressing consumption of fuel.

The fuel consumption evaluation lamp ECU 40 turns on the lamp 40a when the combination of the above pieces of information coincides with the condition for suppressing consumption of fuel. As a result, when the lamp 40a is turned on, it may be determined that the driver performs driving operation in which consumption of fuel is suppressed; whereas, when the lamp 40a is turned off, the driver performs driving operation in which fuel is excessively consumed. In addition, when the fuel consumption evaluation lamp ECU 40 turns on the lamp 40a, the fuel consumption evaluation lamp ECU 40 outputs information that indicates that the lamp 40a is turned on to the control unit 20. Thus, the control unit 20 is able to determine whether the lamp 40a is turned on or turned off on the basis of information output from the fuel consumption evaluation lamp ECU 40. Furthermore, the fuel consumption evaluation lamp ECU 40 outputs information that indicates the above described consumption of fuel to the control unit 20. The control unit 20 is able to determine the fuel consumption (km/l) of the vehicle at each position on the basis of the information that indicates the consumption of fuel.

The user I/F unit 44 is an interface unit that inputs a driver's command and that is used to provide various pieces of information to the driver. The user I/F unit 44 includes an input unit, such as a switch and a display unit formed of a touch panel display (not shown), and a voice output unit, such as a speaker. The user I/F unit 44 receives a control signal from the control unit 20 and displays an image for providing various guides on the touch panel display.

Map information 30a is stored in a storage medium 30. The map information 30a includes node data, shape interpolation point data, link data, and the like. The node data indicate the positions, or the like, of nodes corresponding to end points of roads on which the vehicle travels. The shape interpolation point data indicate the positions, or the like, of shape interpolation points for determining the shape of a road between the nodes. The link data indicate links between the nodes. In addition, in the present embodiment, evaluation information 30b is stored in the storage medium 30 each time the vehicle travels. The evaluation information 30b indicates evaluations of fuel consumption of the vehicle. The evaluation information 30b is information that indicates a rate at which the above described lamp 40a has been turned on in an intended fuel consumption evaluation section within a unit section. In addition, when the evaluation information 30b is stored at the time when the vehicle is travelling toward a set destination, information that indicates the destination and a departure point is stored in association with the evaluation information 30b.

The control unit 20 executes the evaluation indication program 21 included in the navigation program to display a map, including current evaluations and previous evaluations, on the display unit of the user I/F unit 44. The evaluation indication program 21 includes a map display control unit 21a, a current evaluation acquisition unit 21b and a previous evaluation acquisition unit 21c.

The map display control unit 21a is a program module that causes the control unit 20 to implement the function of displaying a current position of the vehicle together with a map around the current position on the display unit of the user I/F unit 44 and indicating current evaluations and previous evaluations together (at the same time) by unit sections on the map. Specifically, the control unit 20 determines the current position of the vehicle on the basis of the output signals of the GPS receiving unit 41, vehicle speed sensor 42 and gyro sensor 43, determines the display range of the map around the current position of the vehicle, and extracts information about roads, facilities, and the like, in the display range from the map information 30*a*. Then, the control unit 20 outputs a control signal for displaying the current position of the vehicle and a control signal for drawing a map that indicates roads, facilities, and the like, around the current position to the display unit of the user I/F unit 44. As a result, the display unit of the user I/F unit 44 displays the map that indicates the roads, facilities, and the like, around the current position of the vehicle and the current position of the vehicle.

The current evaluation acquisition unit 21*b* is a program module that causes the control unit 20 to implement the function of acquiring current evaluations that indicate evaluations of fuel consumption of the vehicle in current travel by unit sections. The unit section is a section of a set distance (for example, 100 m) in the present embodiment. The control unit 20 executes evaluation information acquisition process (described later) while the vehicle is travelling, acquires the turn-on rate of the lamp 40*a* in each unit section, and stores the turn-on rate of the lamp 40*a* in each unit section as the evaluation information 30*b*. The evaluation information 30*b* is used to generate current evaluations and previous evaluations.

In the present embodiment, when the driver operates the user I/F unit 44 to set a destination, the function of the navigation program sets the current position of the vehicle at the time when the destination is set as a departure point and searches for a route from the departure point to the destination to guide the driver. Travel from the departure point to the destination at present is regarded as current travel. In addition, a current travel section that is a section in which the vehicle has currently travelled is a section from a departure point as a start point to a current position as an end point. A total distance of the current travel section increases as the vehicle travels until the vehicle reaches the destination. When the vehicle has travelled toward a destination and reached the set destination, the control unit 20 stores the pieces of evaluation information 30*b* for unit sections from the departure point to the destination in association with the departure place and the destination.

The control unit 20 acquires evaluations regarding the current travel as current evaluations from the evaluation information 30*b* through the process executed by the current evaluation acquisition unit 21*b*. Therefore, the control unit 20 acquires the evaluation information 30*b* for each unit section in the current travel section after the vehicle starts travelling at the departure point before the vehicle reaches the destination. Then, the control unit 20 compares the turn-on rate of the lamp 40*a* (the rate of distance travelled in a state where the lamp 40*a* is turned on) in each unit section, indicated by the evaluation information 30*b*, with a predetermined rate. As a result, the control unit 20 determines that the evaluation of fuel consumption is "good" when the turn-on rate of the lamp 40*a* is higher than or equal to the predetermined rate, determines that the evaluation of fuel consumption is "bad" when the turn-on rate of the lamp 40*a* is lower than the predetermined rate, and sets the evaluation of the fuel consumption as a current evaluation for each unit section. As the turn-on rate of the lamp 40*a* increases, the fuel consumption decreases, so the turn-on rate of the lamp 40*a* corresponds to the frequency of driving operation that contributes to improved fuel consumption. Thus, it is possible to evaluate whether there is driving operation for improving the fuel consumption by using the turn-on rate of the lamp 40*a*. The predetermined rate just needs to be determined at the time of evaluating the fuel consumption, and, in the present embodiment, the predetermined rate is set on the basis of a diagnostic difficulty level set by the driver in advance. That is, the predetermined rate is set so as to increase as the diagnostic difficulty level increases.

Furthermore, in the present embodiment, the control unit 20 acquires a current average fuel consumption that indicates the average fuel consumption of the vehicle in current travel through the process executed by the current evaluation acquisition unit 21*b*. That is, when the vehicle has travelled toward a set destination, the control unit 20 determines the fuel consumptions of the vehicle at respective positions on the basis of information that indicates consumption of fuel from a departure point to a current position, and averages the fuel consumptions of the vehicle at the respective positions. Then, the control unit 20 associates the averaged fuel consumption (average fuel consumption) with the departure point and the destination, and stores the averaged fuel consumption as the evaluation information 30*b*. Then, the control unit 20 acquires the average fuel consumption regarding the current travel as a current average fuel consumption among the average fuel consumptions indicated by the evaluation information 30*b* through the process executed by the current evaluation acquisition unit 21*b*. The average fuel consumption included in the evaluation information 30*b* is sequentially updated as the vehicle travels. Thus, before the vehicle reaches the destination, the average fuel consumption in process in which the vehicle travels from the departure point to a point behind the destination in the travelling direction is stored in association with the departure point and the destination. On the other hand, when the vehicle reaches the destination, the average fuel consumption in process in which the vehicle travels from the departure point to the destination is stored in association with the departure point and the destination.

The previous evaluation acquisition unit 21*c* is a program module that causes the control unit 20 to implement the function of acquiring previous evaluations that indicate evaluations of fuel consumption of the vehicle in previous travel prior to the current travel by unit sections. In the present embodiment, the control unit 20 regards travel of the vehicle, in which the vehicle has departed from the same point as the departure point of the current travel and reached to the same point as the destination of the current travel in the past prior to the current travel, as previous travel for which previous evaluations are indicated. Then, the control unit 20 acquires an evaluation for each unit section within a section in which the vehicle has travelled in previous travel as a previous evaluation.

Therefore, the control unit 20 acquires the evaluation information 30*b* (information that indicates the turn-on rate of the lamp 40*a*) with which the same departure point and destination as those of the above described current travel are associated. When a plurality of pieces of the evaluation information 30*b* with which the same departure point and destination as those of the current travel are associated, for example, from among the pieces of evaluation information 30*b* associated with the departure point and the destination, the evaluation information 30*b* having the best average fuel consumption (that is, the evaluation information 30*b* having the lowest average fuel consumption in the past) may be acquired as a previous evaluation. Then, the control unit 20 compares the turn-on rate of the lamp 40*a* with the predetermined rate, determines that the evaluation of fuel consumption is "good" when the turn-on rate of the lamp 40*a* is higher than or equal to the predetermined rate, and determines that the evaluation of fuel consumption is "bad" when the turn-on rate is lower than the predetermined rate. In order to determine whether the departure point and the destination are the same between current travel and previous travel, a predetermined margin is provided at the position of each point and then, for example, when the distance between two points is shorter than or equal to 300 m, the two points may be regarded as the same point.

Furthermore, in the present embodiment, the control unit 20 acquires a previous average fuel consumption that indicates the average fuel consumption of the vehicle in previous travel through the process executed by the previous evaluation acquisition unit 21*c*. That is, the control unit 20 consults the evaluation information 30*b*, extracts the lowest average fuel consumption from among the fuel consumptions included in the evaluation information 30*b* with which the same departure point and destination as those of the above described current travel are associated, and acquires the lowest average fuel consumption as the previous average fuel consumption through the process executed by the previous evaluation acquisition unit 21*c*. In the present embodiment, an average fuel consumption is determined each time the vehicle travels from a departure point to a destination once and then the lowest average fuel consumption is extracted from among the previous one or more average fuel consumptions to acquire the previous average fuel consumption; instead, a value obtained by averaging a plurality of previous average fuel consumptions may be obtained as the previous average fuel consumption.

When the current evaluations, the previous evaluations, the current average fuel consumption and the previous average fuel consumption are acquired, the control unit 20 outputs a control signal for drawing the current evaluations, the previous evaluations, the current average fuel consumption and the previous average fuel consumption on the map to the display unit of the user I/F unit 44 through the process executed by the map display control unit 21*a*. In order to indicate the current evaluations and the previous evaluations, the control unit 20 extracts a current travel section and a previous travel section from the map currently displayed on the display unit of the user I/F unit 44. Then, the control unit 20 determines current evaluations and previous evaluations by unit sections in the respective sections, and outputs a control signal for drawing the current evaluations and the previous evaluations on the map to the display unit of the user I/F unit 44. As a result, the display unit of the user I/F unit 44 indicates the current evaluations and previous evaluations by unit sections, the current average fuel consumption and the previous average fuel consumption.

Figure 4A:
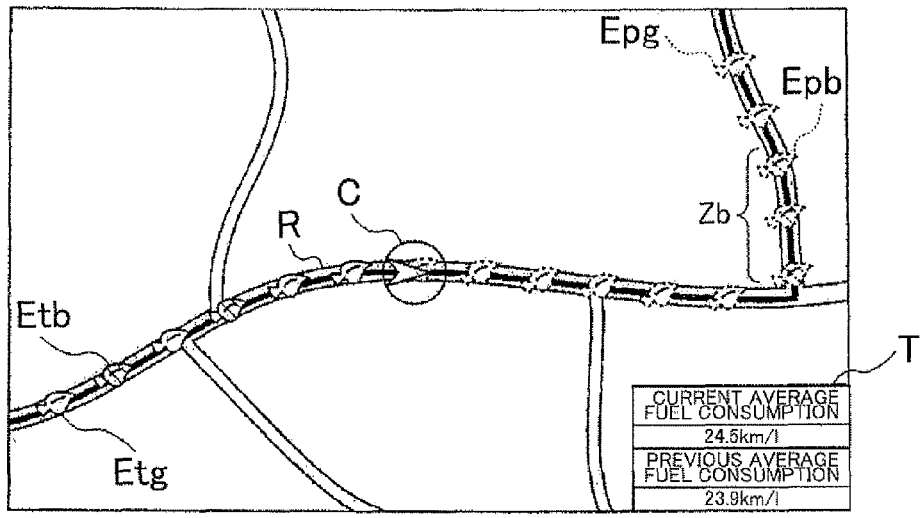
FIG. 4A and FIG. 4D are views that show examples of maps displayed and FIG. 4B, FIG. 4C and FIG. 4E are views that show examples in which evaluations are indicated by unit sections.

FIG. 4A shows an example of a map displayed on the display unit. In this example, an icon C that indicates the current position of a vehicle is shown on a road R indicated by the solid curve. In addition, in the example shown in FIG. 4A, icons that are shaped like a leaf are used to indicate evaluations of fuel consumptions on the road R. Specifically, a solid-line icon Etg indicates a "good" current evaluation, a solid-line hatched icon Etb indicates a "bad" current evaluation, a broken-line icon Epg indicates a "good" previous evaluation and a broken-line hatched icon Epb indicates a "bad" previous evaluation. In addition, in the example shown in FIG. 4A, a rectangular region T is provided at the lower right side of the map displayed on the display unit, and a current average fuel consumption (24.5 km/l in the drawing) and a previous average fuel consumption (23.9 km/l in the drawing) are indicated in the region T. Note that the wide line drawn on the road R indicates a scheduled travel route for reaching a destination from a departure point in current travel.

As described above, according to the present embodiment, the current evaluations and the previous evaluations are indicated on the map displayed on the display unit of the user I/F unit 44 such that the current evaluations and the previous evaluations may be visually recognized at the same time. As a result, the driver is able to drive while easily comparing the current evaluations of fuel consumption with the previous evaluations of fuel consumption. In addition, as in the case of the example shown in FIG. 4A, by indicating the current evaluations and the previous evaluations on the map in different modes (solid line and broke line), the driver is able to clearly distinguish the current evaluations and the previous evaluations from each other without any confusion.

Here, the current evaluations and the previous evaluations are defined by unit sections. In current travel and in previous travel, the vehicle usually travels a plurality of unit sections, so current evaluations and previous evaluations in a plurality of successive unit sections are indicated on the map. When current evaluations are indicated on the map over a plurality of unit sections, the driver is able to understand that the total fuel consumption amount tends to be suppressed or the total fuel consumption amount tends to be large in a plurality of travelled unit sections, on the basis of the evaluations of fuel consumption over the plurality of travelled unit sections. For example, in the example shown in FIG. 4A, it may be understood that the total fuel consumption amount tends to be suppressed when the number of solid-line hatched icons Etg is small and the total fuel consumption amount tends to be large when the number of icons Etg is large.

In addition, when previous evaluations are indicated on the map over a plurality of unit sections, the driver is able to recognize the previous evaluations over the plurality of unit sections. Then, the driver is able to understand that the total fuel consumption amount tends to be suppressed or the total fuel consumption amount tends to be large in the past, on the basis of the previous evaluations over the plurality of unit sections. Thus, in a section in which the total fuel consumption amount tends to be suppressed in the past, the driver is able to estimate that the driver easily drive while suppressing consumption of fuel at the time of travelling the same section again. On the other hand, in a section in which the total fuel consumption amount tends to be large in the past, the driver is able to estimate that there is room for improvement of fuel consumption at the time of travelling that section. That is, the driver is able to determine a guideline of travel in a section travelled in the past on the basis of the evaluations of fuel consumption in that section. For example, in the example shown in FIG. 4A, from the current position C, the total fuel consumption amount tends to be suppressed in a section other than a section Zb, and the driver is able to estimate that the driver easily drives while suppressing consumption of fuel at the time of travelling the same section again. In addition, the total fuel consumption amount tends to be large in the section Zb, and the driver is able to estimate that there is room for improvement of fuel consumption at the time of travelling the section Zb.

In the present embodiment, the current evaluations of the respective unit sections and previous evaluations of the respective unit sections are indicated together on the map, so the driver is able to drive while contrasting the current evaluations with the previous evaluations over the plurality of unit sections. Generally, the driver cannot stare at the display unit while the vehicle is running, and the driver is just able to intermittently visually recognize information indicated on the display unit. Even when the evaluation of fuel consumption at an instance at which the vehicle is travelling at a current position is intermittently recognized and is compared with a previous evaluation, it is difficult to determine whether a fuel consumption amount may be suppressed in process from a start of travel to an end of travel.

On the other hand, in the present embodiment, because the current evaluations and previous evaluations of the respective unit section are indicated on the map together, the driver is able to understand that the current evaluations and previous evaluations of the plurality of unit sections at sight. Thus, the driver contrasts current evaluations with previous evaluations in unit sections that may be travelled from the current position to thereby make it possible to drive while determining a guideline of travel in a section to be travelled in the future (section travelled in the past) on the basis of a degree of the total fuel consumption amount in current travel. For example, according to the example shown in FIG. 4A, the driver is able to understand the ratio of the evaluation Etg indicating a "good" current evaluation to the evaluation Etb indicating a "bad" current evaluation only at sight. Thus, it is possible to recognize whether the total fuel consumption amount is relatively large or small in the current travel up to the current position on the basis of the ratio of the evaluation Etg to the evaluation Etb.

In addition, the driver is able to understand the ratio of the evaluation Epg indicating a "good" previous evaluation to the evaluation Epb indicating a "bad" previous evaluation with just a glance at the map. Thus, it is possible to understand a section in which the total fuel consumption amount is relatively large and a section in which the total fuel consumption amount is relatively small in the previous travel of a section from the current position on the basis of the ratio of the evaluation Epg to the evaluation Epb. For example, in the example shown in FIG. 4A, it is possible to immediately visually recognize the section Zb in which the total fuel consumption amount is relatively large. Then, for example, when the total fuel consumption amount in current travel is relatively large and the driver intends to suppress the fuel consumption amount in the following travel, the driver is able to estimate that the fuel consumption may be improved by suppressing an accelerator operation amount in the section in which the total fuel consumption amount tends to be large in previous travel. In addition, the driver is able to estimate that the consumption of fuel may be suppressed even when the driver does not excessively carefully drive in a section in which the total fuel consumption amount is suppressed in previous travel.

When a currently travelled section coincides with a previously travelled section, that is, when the vehicle has currently travelled a section in which previous evaluations are indicated, it is possible to contrast the current evaluations with the previous evaluations in the same unit sections. In this case, the driver is able to recognize how the current evaluations have varied in comparison with the previous evaluations. Thus, the driver is able to drive while understanding whether the total fuel consumption amount in a currently travelled section is improved as compared with that in the past.

When a departure point and a destination are the same between current travel and previous travel, usually, the navigation program searches for the same route. When the current travel and the previous travel use the same route, the current evaluations Etg and Etb are indicated for the route from the departure point to the current position as shown in FIG. 4A. The previous evaluations Epg and Epb are indicated for at least a route from the current position to the destination. In this case, the previous evaluations Epg and Epb are evaluations of fuel consumption of the vehicle in the case where the vehicle has travelled a section, including the current position C, in the past prior to the current travel. That is, the section in which the previous evaluations Epg and Epb are indicated includes a road on which the vehicle travels after the current position C as shown in FIG. 4A. Therefore, the driver recognizes the previous evaluations Epg and Epb after the current position and, in addition, is able to drive while contrasting them with the current evaluations Etg and Etb before the current position. Thus, according to the present embodiment, at the time of currently travelling from a departure point toward a destination, the driver is able to drive while determining a guideline of travel for suppressing the total fuel consumption as compared with previous travel.

Furthermore, in the present embodiment, in addition to the evaluations of fuel consumption of the respective unit sections, a current average fuel consumption and a previous average fuel consumption, which are the evaluations of fuel consumption over the plurality of unit sections, are indicated on the display unit of the user I/F unit 44 (indicated in the lower right rectangular region T in FIG. 4A). Thus, the driver is able to recognize the current average fuel consumption and the previous average fuel consumption that are the evaluations over the plurality of unit sections in addition to the current evaluations and previous evaluations of the respective unit sections, so it is possible to further easily determine a current total fuel consumption and a previous total fuel consumption.

(2) Evaluation Information Acquisition Process

Figure 2:
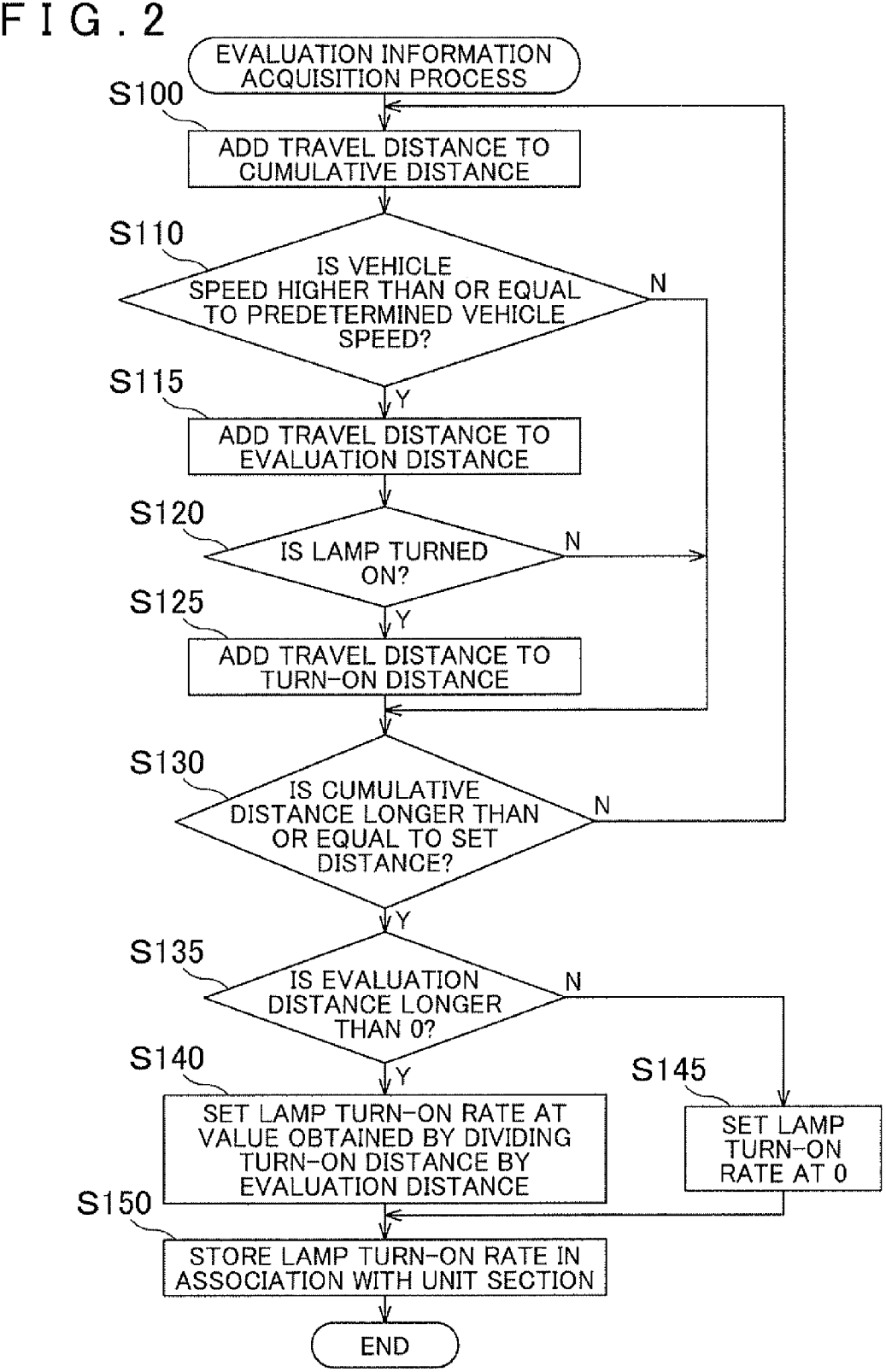
FIG. 2 is a flow chart that shows an evaluation information acquisition process.

Next, the evaluation information acquisition process will be described in detail. FIG. 2 is a flow chart of the evaluation information acquisition process. In the present embodiment, the control unit 20 executes the evaluation information acquisition process using the current evaluation acquisition unit 21b after the vehicle starts travelling toward a set destination. Before the evaluation information acquisition process is executed, the control unit 20 initializes a variable that indicates a cumulative distance for determining whether the vehicle has travelled a set distance defined as the length of a unit section, a variable that indicates an evaluation distance for determining a distance that an evaluation of fuel consumption is allowed within each unit section and a variable that indicates a turn-on distance for determining a distance that the vehicle has travelled in a state where the lamp 40a is turned on.

The control unit 20 adds a travel distance to the cumulative distance (step S100). In the present embodiment, steps S100 to S130 form a loop process, and the process of step S100 is executed at a set interval (for example, 100 ms) when the loop process is repeated. Then, the control unit 20 determines a travel distance ΔL that the vehicle has travelled during a period from when step S100 is previously executed to when step S100 is currently executed, on the basis of the output signals of the GPS receiving unit 41, vehicle speed sensor 42 and gyro sensor 43, and adds the travel distance ΔL to the cumulative distance. That is, the control unit 20 executes adding process such that a value that indicates a total distance that the vehicle has travelled during a period in which steps S100 to S130 are repeated becomes the cumulative distance.

Subsequently, the control unit 20 determines whether the vehicle speed is higher than or equal to a predetermined vehicle speed (step S110), and, when it is not determined that the vehicle speed is higher than or equal to the predetermined vehicle speed, steps S115 to S125 are skipped. On the other hand, in step S110, when it is determined that the vehicle speed is higher than or equal to the predetermined vehicle speed, the control unit 20 adds the travel distance to the evaluation distance (step S115). That is, the above described travel distance ΔL added to the cumulative distance in step S100 is added to the evaluation distance.

The predetermined vehicle speed, which is a determination condition used in determination of step S110, just needs to be defined in advance as a vehicle speed (for example, 4 km/h) below which a significant evaluation of fuel consumption cannot be performed. That is, when the vehicle speed is excessively low, it is difficult to distinguish driving operation in which consumption of fuel is suppressed and driving operation in which fuel is excessively consumed from each other, so the fuel consumption is not evaluated in the case where the vehicle speed is lower than the predetermined speed. Thus, in the present embodiment, when the vehicle speed is lower than the predetermined vehicle speed, it is considered that a significant evaluation of fuel consumption cannot be performed and then step S115 is not executed; whereas, when the vehicle speed is higher than or equal to the predetermined vehicle speed, it is considered that a significant evaluation of fuel consumption can be performed and then the evaluation distance is increased by the travel distance ΔL in step S115. The predetermined vehicle speed may be equal to a predetermined threshold of vehicle speed, set as one of conditions at the time when the fuel consumption evaluation lamp ECU 40 turns on the lamp 40a.

Furthermore, the control unit 20 determines whether the lamp 40a is turned on (step S120), and, when it is not determined that the lamp 40a is turned on, step S125 is skipped. On the other hand, in step S120, when it is determined that the lamp 40a is turned on, the control unit 20 adds the travel distance to the turn-on distance (step S125). That is, when it is allowed to perform a significant evaluation of fuel consumption and the lamp 40a is turned on, the control unit 20 adds the above described travel distance ΔL, added to the cumulative distance in step S100, to the turn-on distance.

Subsequently, the control unit 20 determines whether the cumulative distance is longer than or equal to a set distance (step S130), and repeats the processes of step S100 and the following steps until it is determined in step S130 that the cumulative distance is longer than or equal to the set distance. That is, when the cumulative distance is longer than or equal to the set distance that is defined in advance as the distance of the unit section, the control unit 20 considers that the vehicle has travelled the unit section and exits from the loop process of steps S100 to S130.

When it is determined in step S130 that the cumulative distance is longer than or equal to the set distance, the control unit 20 determines whether the evaluation distance is longer than 0 (step S135). That is, it is determined whether there is a section in which a significant evaluation is allowed during the vehicle travel in the unit section. When it is determined in step S135 that the evaluation distance is longer than 0, the control unit 20 sets the turn-on rate of the lamp 40a at a value obtained by dividing the turn-on distance by the evaluation distance (step S140). On the other hand, when it is not determined in step S135 that the evaluation distance is longer than 0, the control unit 20 sets the turn-on rate of the lamp 40a at 0 (step S145). That is, when the evaluation distance (denominator for evaluating the turn-on rate) is not 0, the turn-on rate is calculated on the basis of the turn-on distance and the evaluation distance; whereas, when the evaluation distance is 0, the turn-on rate cannot be calculated because of the definition of the turn-on rate, so the turn-on rate is set at 0. The turn-on rate in the case where the evaluation distance is 0 may be, for example, unevaluable.

Subsequently, the control unit 20 stores the turn-on rate of the lamp 40a, set in step S140 or S145, in the storage medium 30 as the evaluation information 30b in association with the unit section (step S150). According to the above process, the evaluation information 30b for each unit section may be stored in the storage medium 30.

When the evaluation information acquisition process is executed in a state where the destination of the vehicle is set, the control unit 20 stores information that indicates the destination and the departure point in association with the evaluation information 30b in step S150.

(3) Evaluation Information Indication Process

Figure 3A:
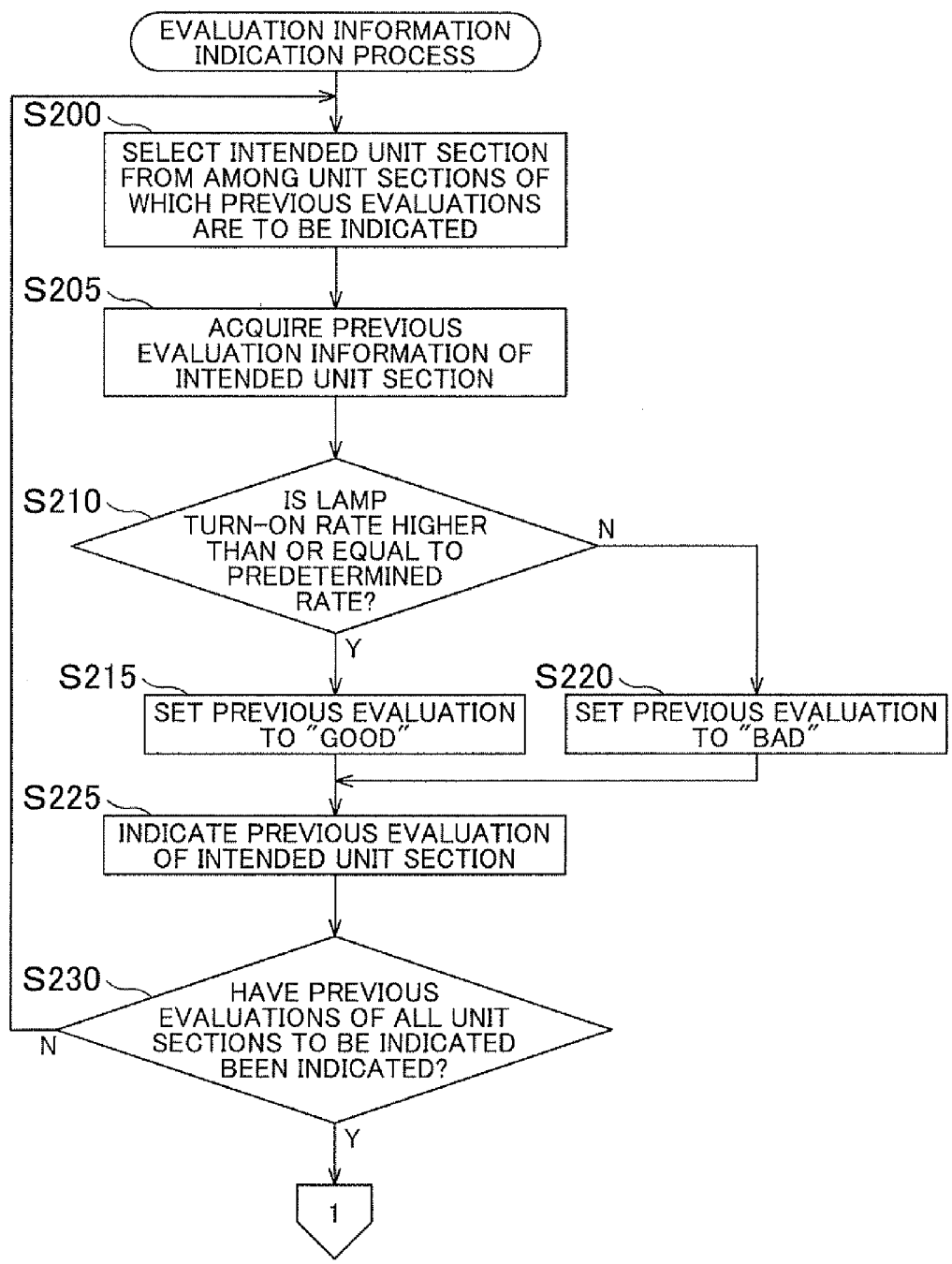
FIG. 3A and FIG. 3B are flow charts that show an evaluation information indication process.
Figure 3B:
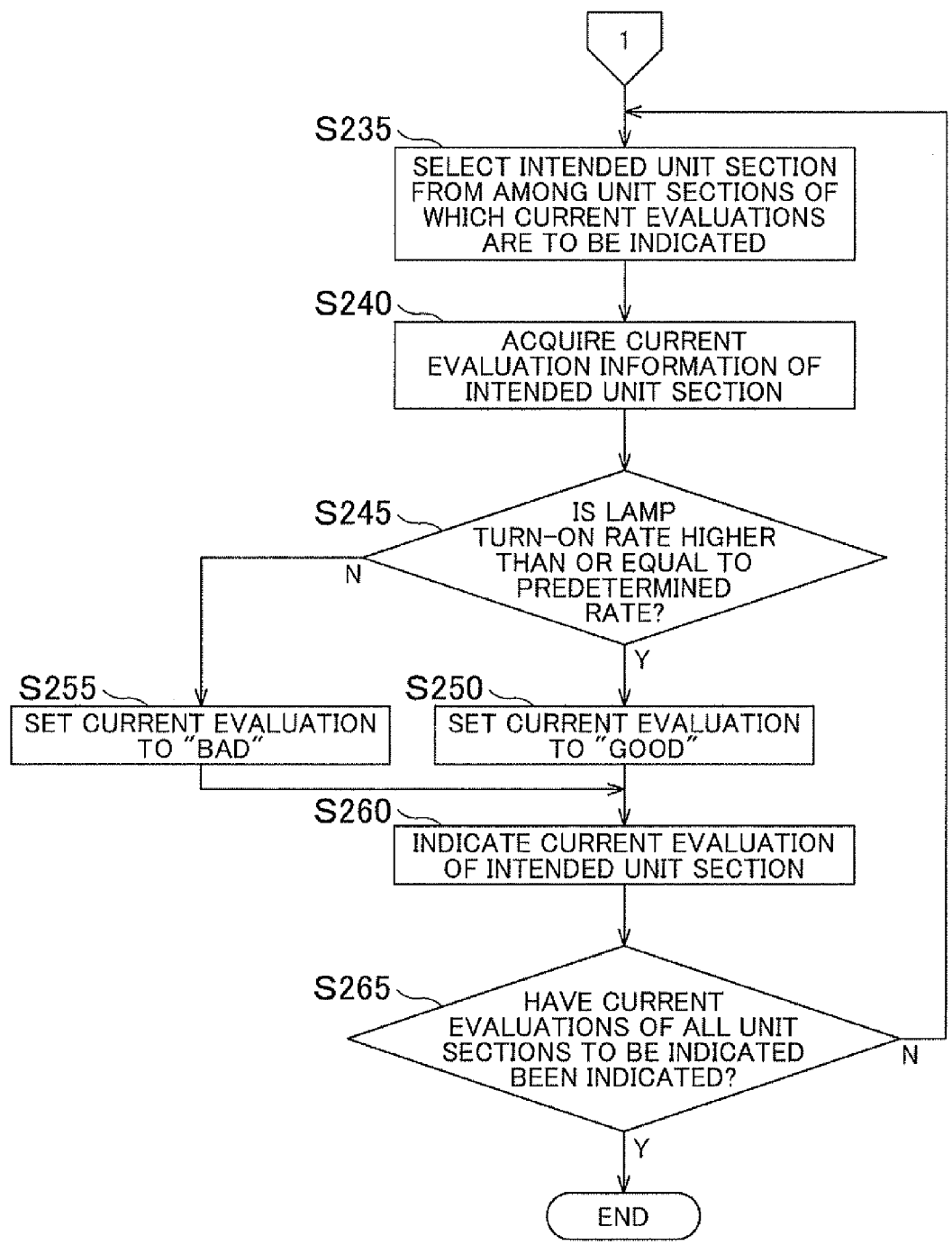

Next, the evaluation information indication process will be described in detail. FIG. 3A and FIG. 3B are flow charts of the evaluation information indication process. In the present embodiment, the evaluation information indication process is executed when a destination is set by the driver and there is the evaluation information 30b for previous travel of which the departure point and destination are the same as the departure point and destination of current travel. In addition, the control unit 20 updates map display on the display unit of the user I/F unit 44 at predetermined intervals. Each time the map display is updated, the evaluation information indication process is executed. Furthermore, before the evaluation information indication process is executed, the above described diagnostic difficulty level is determined by a driver's command or a default value in advance.

Steps S200 to S230 shown in FIG. 3A form a loop process for indicating previous evaluations on the map. The control unit 20 initially selects an intended unit section from among unit sections of which previous evaluations are to be indicated through the processes executed by the map display control unit 21a and the previous evaluation acquisition unit 21c (step S200). That is, the control unit 20 determines the range of the map displayed on the display unit of the user I/F unit 44 through the process executed by the map display control unit 21a. Furthermore, the control unit 20 extracts the evaluation information 30b having the best average fuel consumption associated with the departure point and the destination, from among the pieces of evaluation information 30b associated with the same departure point and destination as the departure point and destination of the current travel, through the process executed by the previous evaluation acquisition unit 21c. Furthermore, the control unit 20 determines unit sections included in the range of the map displayed on the display unit of the user I/F unit 44, from among the unit sections associated with the extracted pieces of evaluation information 30b, as the unit sections to be indicated through the process executed by the map display control unit 21a. Then, from among the unit sections to be indicated, any one of the unit sections for which the process of indicating a previous evaluation is not executed is selected as an intended unit section.

Subsequently, the control unit 20 acquires the previous evaluation information 30b of the intended unit section through the process executed by the previous evaluation acquisition unit 21c (step S205). That is, the turn-on rate of the lamp 40a in the intended unit section in the previous travel is acquired. Subsequently, the control unit 20 determines whether the turn-on rate of the lamp 40a in the intended unit section in the previous travel is higher than or equal to the predetermined rate through the process executed by the previous evaluation acquisition unit 21c (step S210). When it is determined in step S210 that the turn-on rate of the lamp 40a is higher than or equal to the predetermined rate, the control unit 20 sets the previous evaluation of the intended unit section as "good" through the process executed by the previous evaluation acquisition unit 21c (step S215). On the other hand, when it is not determined in step S210 that the turn-on rate of the lamp 40a is higher than or equal to the predetermined rate, the control unit 20 sets the previous evaluation of the intended unit section as "bad" through the process executed by the previous evaluation acquisition unit 21c (step S220). The predetermined rate to be compared with the turn-on rate of the lamp 40a is set on the basis of the above described diagnostic difficulty level, and is set so as to be larger as the diagnostic difficulty level increases. Thus, as the diagnostic difficulty level increases, a previous evaluation is hard to be set as "good".

Next, the control unit 20 indicates the previous evaluation of the intended unit section through the process executed by the map display control unit 21a (step S225). That is, the control unit 20 outputs a signal to the display unit of the user I/F unit 44 for drawing an icon corresponding to the previous evaluation of the intended unit section so that the icon is indicated in the unit section. As a result, the display unit of the user I/F unit 44 indicates the icon corresponding to the previous evaluation of the intended unit section.

Subsequently, the control unit 20 determines whether the previous evaluations of all the unit sections to be indicated have been indicated through the process executed by the map display control unit 21a (step S230). That is, the control unit 20 determines whether the previous evaluations have been indicated for all the unit sections to be indicated, determined in step S200. In step S230, when it is not determined that the previous evaluations of all the unit sections to be indicated have been indicated, the processes of step S200 and the following steps are repeated. On the other hand, when it is determined in step S230 that the previous evaluations of all the unit sections to be indicated have been indicated, the process for indicating current evaluations is executed in step S235 and the following steps. At the time when the previous evaluations of all the unit sections to be indicated have been indicated, the solid-line icons Etg and Etb (icons that indicate current evaluations) shown in FIG. 4A have not been indicated yet, and only the broken-line icons Epg and Epb (icons that indicate the previous evaluations) have been indicated. When the route is the same between the current travel and the previous travel, previous evaluations are indicated in the unit sections behind the current position of the vehicle; however, when current evaluations are indicated in the unit sections in which the previous evaluations have been indicated, the current evaluations are preferentially indicated through the processes in step S235 and the following steps.

Steps S235 to S265 shown in FIG. 3B form a loop process for indicating current evaluations on the map. The control unit 20 initially selects an intended unit section from among unit sections of which current evaluations are to be indicated through the processes executed by the map display control unit 21a and the current evaluation acquisition unit 21b (step S235). That is, the control unit 20 determines the range of the map displayed on the display unit of the user I/F unit 44 through the process executed by the map display control unit 21a. Furthermore, the control unit 20 determines the unit sections included in the range of the map displayed on the display unit of the user I/F unit 44, from among the unit sections associated with the pieces of evaluation information 30b stored in the storage medium 30 during the current travel, as the unit sections to be indicated through the process executed by the current evaluation acquisition unit 21b. Then, from among the unit sections to be indicated, any one of the unit sections that have not been subjected to the process of indicating a current evaluation is selected as an intended unit section.

Subsequently, the control unit 20 acquires current evaluation information of the intended unit section through the process executed by the current evaluation acquisition unit 21b (step S240). That is, the turn-on rate of the lamp 40a in the intended unit section in the current travel is acquired. Subsequently, the control unit 20 determines whether the turn-on rate of the lamp 40a in the intended unit section in the current travel is higher than or equal to the predetermined rate through the process executed by the current evaluation acquisition unit 21b (step S245). When it is determined in step S245 that the turn-on rate of the lamp 40a is higher than or equal to the predetermined rate, the control unit 20 sets the current evaluation of the intended unit section as "good" through the process executed by the current evaluation acquisition unit 21b (step S250). On the other hand, when it is not determined in step S245 that the turn-on rate of the lamp 40a is higher than or equal to the predetermined rate, the control unit 20 sets the current evaluation of the intended section as "bad" through the process executed by the current evaluation acquisition unit 21b (step S255). The predetermined rate to be compared with the turn-on rate of the lamp 40a is equal to the predetermined rate in step S210.

Subsequently, the control unit 20 indicates the current evaluation of the intended unit section through the process executed by the map display control unit 21a (step S260). That is, the control unit 20 outputs a signal to the display unit of the user I/F unit 44 for drawing an icon corresponding to the current evaluation of the intended unit section so that the icon is indicated in the unit section. As a result, the display unit of the user I/F unit 44 indicates the icon corresponding to the current evaluation of the intended unit section.

Subsequently, the control unit 20 determines whether the current evaluations of all the unit sections to be indicated have been indicated through the process executed by the map display control unit 21a (step S265). That is, the control unit 20 determines whether the current evaluations of all the unit sections to be indicated, determined in step S235, have been indicated. When it is not determined in step S265 that the current evaluations of all the unit sections to be indicated have been indicate, the processes of step S235 and the following steps are repeated. On the other hand, when it is determined in step S265 that the current evaluations of all the unit sections to be indicated have been indicated, the control unit 20 ends the evaluation information indication process. In the present embodiment, when the current evaluation is indicated in the unit section in which the previous evaluation has been indicated, the current evaluation is preferentially indicated. Therefore, when the current evaluations of the unit sections to be indicated have been indicated, the icons Etg and Etb of the current evaluations are indicated by the solid line in sections in which the vehicle has travelled before the current position of the vehicle, as in the case of the example shown in FIG. 4A. In addition, in the processes of steps S235 to S265, no current evaluations are indicated in sections ahead of the current position of the vehicle. Therefore, the icons Epg and Epb of the previous evaluations are indicated by the broken line in the sections ahead of the current position of the vehicle.

(4) Alternative Embodiments

The above described embodiment is just an example for carrying out the aspect of the invention, and, as long as current evaluations and previous evaluations of the respective unit sections are indicated together (at the same time), various other embodiments may be employed. For example, the current evaluations and the previous evaluations may be acquired from a device not equipped for the vehicle, such as an information management center. The navigation terminal 10 may be fixedly mounted on the vehicle or the portable navigation terminal 10 may be carried into the vehicle and utilized.

The above described vehicle is a vehicle driven by an internal combustion engine; however, the vehicle is not limited to such a vehicle. The vehicle may be configured in a hybrid vehicle or an electric vehicle in which current evaluations and previous evaluations are indicated together on a map.

A fuel consumption may be evaluated on the basis of a condition of a combination of a plurality of elements or may be evaluated on the basis of a condition of one element (for example, a value of fuel consumption). In a hybrid vehicle that is driven using liquid fuel and a battery, it may be determined that the fuel consumption is good in the case where the vehicle is travelling using only a power source of which a unit price for travelling the same distance is cheaper. For example, when the vehicle is able to travel the same distance more cheaply when the vehicle is driven by the battery rather than using liquid fuel, it may be determined that the fuel consumption is good in the case where only the battery is used to drive the vehicle without using liquid fuel. In addition to such an evaluation of fuel consumption, an evaluation of fuel consumption may be performed during hybrid running. A fuel consumption may be evaluated in two levels as in the case of the above described embodiment or may be evaluated in three or more levels.

The evaluation information of the fuel consumption may be any information as long as it becomes a guideline for varying the fuel consumption. The evaluation information may be information that indicates the value of fuel consumption (for example, information that indicates the average fuel consumption in a unit section) or may be information that indicates the result of comparison between a reference fuel consumption and a current fuel consumption (for example, information that indicates a relative relationship with a reference fuel consumption). Furthermore, the evaluation information may be information that evaluates whether there is driving operation for improving the fuel consumption (for example, information that indicates the frequency of driving operation that contributes to improvement in fuel consumption).

A departure point and a destination are not only determined at the time when the driver explicitly specifies a destination, as in the case of the above described configuration, but also may be determined by various methods. For example, a point at which it is determined that, on the basis of the operating state of the vehicle, the vehicle has started off and a point at which it is determined that, on the basis of the operating state of the vehicle, the vehicle has arrived may be respectively set as a departure point and a destination. A current destination may be, for example, estimated on the basis of a current travel route, a previous travel history, and the like.

In the above described embodiment, when the vehicle has travelled in the past from the same departure point as the departure point of current travel to the same destination as the destination of the current travel, the travel section is set as a section for which previous evaluations are indicated; instead, a section for which previous evaluations are indicated may be determined according to another rule. That is, within a previous travel section displayed on the map, a section to be contrasted with current evaluations may be set as a section for which previous evaluations are to be indicated, and evaluations of fuel consumption of the respective unit sections in the section to be indicated may be set as the previous evaluations. Sections for which previous evaluations are indicated may be all or part of the sections having information about a previous evaluation. For example, previous evaluations may be indicated in all or part of unit sections, which have information by which a previous evaluation may be determined, around a current position. In this case, a previous evaluation of fuel consumption is regularly determined and is stored in the storage medium. Then, previous evaluations of all the unit sections, of which previous evaluations of fuel consumption are stored in the storage medium, may be indicated. Here, the all unit sections are sections on roads included in the map. Alternatively, previous evaluations in a section to be indicated, selected from among unit sections of which previous evaluations of fuel consumption are stored in the storage medium, may be indicated. In this case, when the total fuel consumption amount in current travel up to the current position is large and the driver intends to suppress a fuel consumption amount in the following travel, the driver selects a route such that the vehicle travels the section in which the total fuel consumption amount tends to be suppressed in previous travel to thereby make it possible to estimate that consumption of fuel may be suppressed.

When a section to be indicated is selected from among unit sections of which previous evaluations of fuel consumption are stored in the storage medium, previous evaluations that indicate evaluations of fuel consumption of the vehicle for the respective unit sections in the case where the vehicle has travelled a section including the current position in the past prior to current travel may be acquired. That is, a section that includes the current position is set as a section for which the previous evaluations are indicated and then previous evaluations are acquired. With this configuration, in a state where current evaluations behind the current position are indicated on the map, previous evaluations in a section including the current position are indicated together on the map. Because the section that includes the current position includes a road on which the vehicle travels after the current position, the driver is able to recognize previous evaluations after the current position and, further, drive while contrasting them with current evaluations before the current position.

Other than travel from a departure point to a destination is set as current travel, current travel may be defined in various modes. The starting point of a current travel section is not specifically limited; when the vehicle has travelled continuously to the current position, the starting point of the continuous travel may be set as the starting point of the current travel section, and, when the vehicle has travelled discontinuously such as when the vehicle travels at different travel dates, or the like, a point at which the vehicle is present before the current position may be set as the starting point of a section. That is, a current travel section may be defined so that current travel and previous travel are distinguished from and contrasted with each other.

More specifically, for example, when a power source of the vehicle has been started up and then the vehicle has reached the current position without stopping the power source, current evaluations in a section from the position at which the power source has been started up to the current position may be acquired, and previous evaluations before the time when the power source of the vehicle has been started may be acquired. That is, continuous travel from a position at which the latest start-up of the power source (start-up of the power source at previous time closest to current time) had been performed to the current position may be set as current travel to acquire current evaluations, and evaluations of previous travel before the current travel may be set as previous evaluations. In this case, for example, current evaluations may be determined on the basis of the evaluation information 30$b$ acquired after the time at which the latest start-up of the power source of the vehicle has been performed, and previous evaluations may be determined on the basis of the evaluation information 30$b$ acquired before that time. With this configuration, each time the driver starts driving, it is possible to determine whether the fuel consumption is improved with respect to travel before the driver starts driving.

Furthermore, when the vehicle has reached the current position by travel after the time specified by a user, current evaluations in a section from the position of the vehicle at the time specified by the user to the current position may be acquired, and previous evaluations before the time specified by the user may be acquired. That is, evaluations after the time specified by the user and evaluations before the specified time are contrasted with each other. In this case, current evaluations may be determined on the basis of the pieces of evaluation information 30b acquired after the time specified by the user, and previous evaluations may be determined on the basis of the pieces of evaluation information 30b acquired before the specified time. With this configuration, it is possible to determine whether the fuel consumption is improved as compared with travel at the time specified by the user.

A unit section may be a section for leading to the conclusion of an evaluation regarding the fuel consumption. Other than a section having a set distance, a section determined in accordance with a predetermined rule may be set as a unit section, for example. For example, one link that has the closest nodes indicated by map information as end points may be used as one unit section. A unit section of which a current evaluation is to be indicated and a unit section of which a previous evaluation is to be indicated may coincide with each other or may be different from each other. That is, unit sections just need to be determined in accordance with a common rule, and unit sections to be indicated may be selected where appropriate.

Various modes may be assumed as modes for indicating current evaluations and previous evaluations together. Current evaluations and previous evaluations just need to be indicated so as to be recognized by the driver at the same time. Thus, information that directly indicates a current evaluation and a previous evaluation may be indicated or information that directly indicates one of a current evaluation and a previous evaluation and information that indirectly indicates the other may be indicated. As for the latter one, for example, it is applicable that one of a current evaluation and a previous evaluation is indicated and information that indicates a relative relationship between the one and the other (such as information indicating that the other has a better evaluation than the one, information indicating that the other has a worse evaluation than the one and information indicating that the other has an equal evaluation to the one) is indicated.

When traffic information (traffic congestion information, or the like) is indicated on the map, current evaluations and previous evaluations may be indicated on the map in a mode different from that of traffic information. With the above configuration, the driver is able to clearly distinguish traffic information indicated on the map from current evaluations and previous evaluations without any confusion.

When a current evaluation and previous evaluation are acquired for the same unit section and then the current evaluation and previous evaluation of the same unit section are indicated on the map, the current evaluation and the previous evaluation may be indicated in a distinguishable mode in which the current evaluation and the previous evaluation are distinguished from each other. When the current evaluation and previous evaluation of the same unit section are indicated, both tend to be confused. In addition, even when the current evaluation and the previous evaluation are indicated in the same unit section in different modes, but when icons have the same size and the current evaluation and the previous evaluation are indicated at the same position, only one of them is visually recognized. Then, when the current evaluation and the previous evaluation are indicated on the map in a distinguishable mode, the current evaluation and the previous evaluation may be clearly distinguished from each other even when the current evaluation and the previous evaluation are indicated in the same unit section.

Figure 4B:
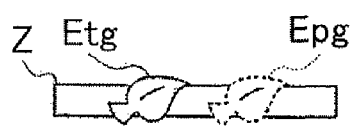

FIG. 4B to FIG. 4E are views that show examples in which current evaluations and previous evaluations are indicated in a distinguishable mode. FIG. 4B shows an example in which, when a current evaluation and previous evaluation are acquired for the same unit section, the current evaluation and the previous evaluation of the same unit section are indicated at different positions on the map. That is, in FIG. 4B, the icon Etg of the current evaluation and the icon Epg of the previous evaluation are indicated in a unit section Z, the icon Etg of the current evaluation is indicated by the solid line, and the icon Epg of the previous evaluation is indicated by the broken line. The icon Etg of the current evaluation and the icon Epg of the previous evaluation are indicated in different modes; however, the icons Etg and Epg have the same size, so the icons Etg and Epg overlap each other if indicated at the same position. Then, as shown in FIG. 4B, even for evaluations of the same unit section Z, the display position of the icon is varied between the current evaluation and the previous evaluation. With this configuration, even when a current evaluation and previous evaluation of the same unit section are indicated, it is possible to prevent the current evaluation and the previous evaluation from completely overlapping each other, so the driver is able to clearly distinguish the current evaluation and the previous evaluation from each other.

Figure 4C:

FIG. 4C shows an example in which a current evaluation and a previous evaluation are indicated in the same unit section on the map with icons having the same shape and different sizes, and, when the icons are overlapped, the smaller icon is superimposed on the larger icon (the smaller icon is indicated in front of the larger icon). In FIG. 4C as well, the icon Etg of the current evaluation is indicated in the unit section Z by the solid line, and the icon Epg of the previous evaluation is indicated in the unit section Z by the broken line. The icon Etg of the current evaluation is smaller than the icon Epg of the previous evaluation. Then, when the icon Etg of the current evaluation overlaps with the icon Epg of the previous evaluation, the icon Etg of the current evaluation, which is a smaller icon, is superimposed on the icon Epg of the previous evaluation, which is a larger icon. As a result, the icon Epg and the icon Etg are displayed such that the icon Etg of the current evaluation, which is a smaller icon, is not hidden by the icon Epg of the previous evaluation, which is a larger icon. With this configuration, it is possible to indicate the entire portion of a smaller icon and at least part of a larger icon, and therefore clearly distinguish the current evaluation and the previous evaluation from each other.

Figure 4D:
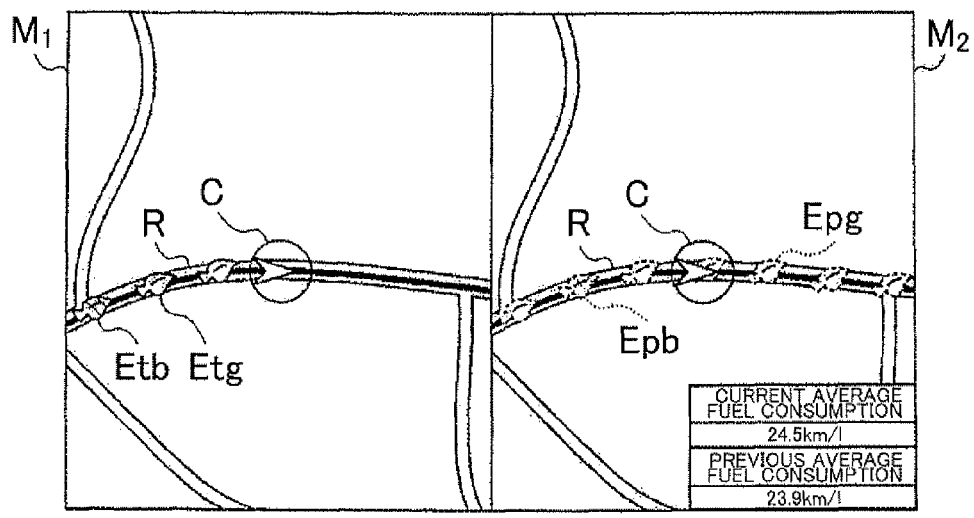

FIG. 4D shows an example in which a first map and a second map that both show a current position and a map around the current position are displayed on the display unit of the user I/F unit 44. In this example, current evaluations are indicated on the first map and previous evaluations are indicated on the second map. That is, in the example shown in FIG. 4D, a first map M1 is displayed at the left side of the display unit of the user I/F unit 44, and a second map M2 is displayed at the right side of the display unit. The current position C of the vehicle is displayed on both the maps M1 and M2. The current evaluations are indicated only in a section behind the current position C, so current evaluations are indicated in the section behind the current position C as indicated by the solid-line icons Etg and Etb on the map M1. On the other hand, the previous evaluations are indicated in a section behind and ahead of the current position C, so previous evaluations are indicated in the section behind and ahead of the current position C as indicated by the broken-line icons Epg and Epb on the map M2. Thus, both the current evaluations and the previous evaluations are indicated in the section behind the current position C; however, the current evaluations and the previous evaluations are indicated on the different maps. With this configuration, even when a current evaluation and previous evaluation of the same unit section are indicated, it is possible to suppress confusion between the current evaluation and the previous evaluation, so it is possible to clearly distinguish the current evaluation and the previous evaluation from each other.

Figure 4E:
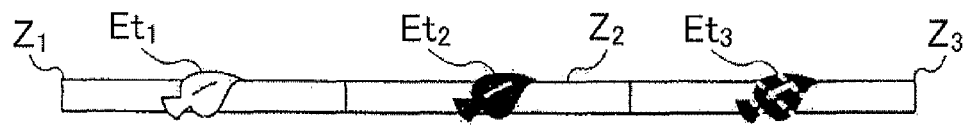

FIG. 4E shows an example in which, when a current evaluation and a previous evaluation are acquired for the same unit section, the current evaluation of the same unit section is indicated on the map and the current evaluation of the same unit section different from the previous evaluation of the same unit section is highlighted. That is, in each unit section, the current evaluation is indicated without highlighting when both the current evaluation and the previous evaluation are the same; whereas the current evaluation different from the previous evaluation is highlighted. With this configuration, the driver is able to recognize that both the current evaluation and the previous evaluation are the same when the current evaluation is not highlighted; whereas the driver is able to recognize that the current evaluation and the previous evaluation are different from each other when the current evaluation is highlighted.

FIG. 4E shows an example in which current evaluations are respectively indicated in unit sections Z1 to Z3. In this example, an icon with no hatching is indicated when the current evaluation is "good", and an icon with hatching is indicated when the current evaluation is "poor". In FIG. 4E, the non-highlighted icon is indicated by the outlined icon, and the highlighted icon is indicated by the solid icon. That is, in the example shown in FIG. 4E, an icon Et1 displayed in the unit section Z1 is an outlined icon with no hatching, so it is apparent that the current evaluation and the previous evaluation are the same in the unit section Z1 and both evaluations are "good". In addition, an icon Et2 displayed in the unit section Z2 is a solid icon with no hatching, so it is apparent that the current evaluation and the previous evaluation are different in the unit section Z2, the current evaluation is "good" and the previous evaluation is "bad", that is, the evaluation is improved. Furthermore, an icon Et3 displayed in the unit section Z3 is a solid icon with hatching, so it is apparent that the current evaluation and the previous evaluation are different in the unit section Z3, the current evaluation is "bad" and the previous evaluation is "good", that is, the evaluation is deteriorated. When a current evaluation and a previous evaluation each are evaluated in two levels, the above configuration is desirable in that a previous evaluation in the case where a current evaluation is highlighted is determined.

As in the case of the evaluation indication system according to the above described embodiment, a manner of indicating a current evaluation and a previous evaluation together in each unit section is applicable as a program or a method. In addition, the above described system, program and method may be implemented as a sole device, may be implemented as a plurality of devices or may be implemented by utilizing a component shared with various portions provided for a vehicle, and are implemented in various forms. For example, it is possible to provide a navigation system, a navigation method and a program that are provided with the device as described above. In addition, an aspect of the invention may be modified where appropriate, for example, part of the aspect of the invention is implemented by software and part of the aspect of the invention is implemented by hardware. Furthermore, the aspect of the invention may include a storage medium that stores a program for controlling the system. The storage medium may be a magnetic storage medium, may be a magnetooptical storage medium or may be any storage media that will be developed in the future.

What is claimed is:

1. An evaluation indication system comprising:
a memory storing an evaluation indication program; and
a processor that, when executing the stored program:
displays a current position of a vehicle and a map around the current position on a display;
acquires current evaluations that indicate evaluations of fuel consumption in a current travel of the vehicle along a route, the route being divided into unit sections and each acquired current evaluation being an evaluation for a unit section of the route;
acquires previous evaluations that indicate evaluations of fuel consumption of the vehicle in a past travel of the vehicle along the route that occurred prior to the current travel, each acquired previous evaluation being an evaluation for a unit section of the route;
indicates the current evaluations of the respective unit sections behind the current position of the vehicle with respect to a travel direction along the route on the map; and
indicates the previous evaluations of the respective unit sections ahead of the current position of the vehicle with respect to the travel direction along the route of the vehicle on the map.

2. The evaluation indication system according to claim 1, wherein the processor, when executing the stored program, acquires the previous evaluation for a particular unit section when the vehicle has travelled that particular unit section as part of the past travel.

3. The evaluation indication system according to claim 1, wherein the processor, when executing the stored program:
when the vehicle is travelling from a departure point toward a destination, acquires the current evaluations for the respective unit section from the departure point to the current position; and
when the departure point matches a departure point of the past travel of the vehicle and the destination matches a destination of the past travel of the vehicle, acquires the previous evaluations.

4. The evaluation indication system according to claim 1, wherein the processor, when executing the stored program:
acquires a previous average fuel consumption that indicates an average fuel consumption of the vehicle in the current travel;
acquires a previous average fuel consumption that indicates an average fuel consumption of the vehicle in the past prior to the current travel; and
indicates the current average fuel consumption and the previous average fuel consumption together on the display.

5. The evaluation indication system according to claim 1, wherein the processor, when executing the stored program, indicates the current evaluations and the previous evaluations on the map in different modes.

6. The evaluation indication system according to claim 1, wherein the processor, when executing the stored program, indicates the current evaluations and the previous evaluations on the map in a mode different from that of traffic information indicated on the map.

7. The evaluation indication system according to claim 1, wherein the processor, when executing the stored program and when a current evaluation and a previous evaluation are acquired for the same unit section, indicates the current evaluation and the previous evaluation of the same unit section on the map in different modes that can he distinguished from one another.

8. The evaluation indication system according to claim 7, wherein the processor, when executing the stored program and when the current evaluation and the previous evaluation are acquired for the same unit section, indicates the current evaluation and the previous evaluation of the same unit section at different positions on the map.

9. The evaluation indication system according to claim 7, wherein the processor, when executing the stored program and when the current evaluation and the previous evaluation are acquired for the same unit section:
   the map display control unit indicates the current evaluation and the previous evaluation in the same unit section on the map with respective icons having the same shape and different sizes; and
   superimposes a smaller one of the icons on a larger one of the icons when the icons overlap each other.

10. The evaluation indication system according to claim 7, wherein the processor, when executing the stored program:
   displays a first map that shows the current position and a map around the current position and a second map that shows the current position and a map around the current position on the display; and
   indicates the current evaluations on the first map, and indicates the previous evaluations on the second map.

11. The evaluation indication system according to claim 7, wherein the processor, when executing the stored program and when the current evaluation and the previous evaluation are acquired for the same unit section:
   indicates the current evaluation of the same unit section on the map; and
   highlights the current evaluation of the same unit section different from the previous evaluation of the same unit section.

12. The evaluation indication system according to claim 1, wherein the processor, when executing the stored program and when a power source of the vehicle has been started up and then the vehicle has reached the current position without stopping the power source:
   acquires the current evaluations for a section of the route from a position, at which the power source has been started up, to the current position; and
   acquires the previous evaluations before a time at which the power source has been started up.

13. The evaluation indication system according to claim 1, wherein the processor, when executing the stored program and when the vehicle has reached the current position after time specified by a user:
   acquires the current evaluations for a section of the route from a position of the vehicle at the time specified by the user to the current position; and
   acquires the previous evaluations before the time specified by the user.

14. An evaluation indication method comprising:
   displaying a current position of a vehicle and a map around the current position on a display;
   acquiring current evaluations that indicate evaluations of fuel consumption in a current travel of the vehicle along a route, the route being divided into unit sections and each acquired current evaluation being an evaluation for a unit section of the route;
   acquiring previous evaluations that indicate evaluations of fuel consumption of the vehicle in a past travel of the vehicle along the route that occurred prior to the current travel, each acquired previous evaluation being an evaluation for a unit section of the route;
   indicating the current evaluations of the respective unit sections behind the current position of the vehicle with respect to a travel direction along the route on the map; and
   indicating the previous evaluations of the respective unit sections ahead of the current position of the vehicle with respect to the travel direction along the route of the vehicle on the map.

15. A non-transitory computer-readable storage medium that stores a computer-executable program for performing an evaluation indication function, the program comprising:
   instructions for displaying a current position of a vehicle and a map around the current position on a display;
   instructions for acquiring current evaluations that indicate evaluations of fuel consumption in a current travel of the vehicle along a route, the route being divided into unit sections and each acquired current evaluation being an evaluation for a unit section of the route;
   instructions for acquiring previous evaluations that indicate evaluations of fuel consumption of the vehicle in a past travel of the vehicle along the route that occurred prior to the current travel, each acquired previous evaluation being an evaluation for a unit section of the route;
   instructions for indicating the current evaluations of the respective unit sections behind the current position of the vehicle with respect to a travel direction along the route on the map; and
   instructions for indicating the previous evaluations of the respective unit sections ahead of the current position of the vehicle with respect to the travel direction along the route of the vehicle on the map.

16. The evaluation system according to claim 1, wherein the processor, when executing the stored program:
   for each unit section along the route, when the current evaluation is acquired, erases the previous evaluation from the map and indicates the current evaluation on the map.

17. The evaluation system according to claim 1, wherein the processor, when executing the stored program:
   for each unit section along the route, when the current evaluation is acquired, indicates the current evaluation at a different position on the unit section from the previous evaluation.

18. The evaluation system according to claim 1, wherein the processor, when executing the stored program:
   for each unit section along the route, when the current evaluation is acquired, indicates the current evaluation at a same position on the unit section as the previous evaluation.

* * * * *